US012643558B2

(12) United States Patent
Park et al.

(10) Patent No.: US 12,643,558 B2
(45) Date of Patent: Jun. 2, 2026

(54) STEERING APPARATUS FOR VEHICLE AND METHOD THEREFOR

(71) Applicant: HYUNDAI MOBIS CO., LTD., Seoul (KR)

(72) Inventors: Hae Kwon Park, Yongin-si (KR); Byeung Su Kim, Yongin-si (KR); Jae Hong Jeon, Seoul (KR); Hyeon Seok Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 65 days.

(21) Appl. No.: 18/457,665

(22) Filed: Aug. 29, 2023

(65) Prior Publication Data

US 2024/0157953 A1     May 16, 2024

(30) Foreign Application Priority Data

Nov. 14, 2022     (KR) ......................... 10-2022-0151846

(51) Int. Cl.
B60W 50/035          (2012.01)
B60W 10/06          (2006.01)
          (Continued)

(52) U.S. Cl.
CPC .......... B60W 50/035 (2013.01); B60W 10/06 (2013.01); B60W 10/184 (2013.01);
          (Continued)

(58) Field of Classification Search
CPC .. B60W 50/035; B60W 10/06; B60W 10/184; B60W 40/105; B60W 40/114;
          (Continued)

(56) References Cited

U.S. PATENT DOCUMENTS

| 9,008,876 B2 * | 4/2015 | Pinto ...................... B60L 50/00 |
| | | 180/312 |
| 11,872,892 B2 * | 1/2024 | Nordmann ............ B60W 30/02 |

(Continued)

FOREIGN PATENT DOCUMENTS

| EP | 3284629 A1 * | 2/2018 | ............ B60T 8/1755 |
| JP | 2008114642 A * | 5/2008 | |

(Continued)

OTHER PUBLICATIONS

Machine Translation of KR20210010729A PDF File Name: "KR20210010729A_Machine_Translation.pdf" (Year: 2021).*

(Continued)

*Primary Examiner* — Grant Moubry
*Assistant Examiner* — Ruben Picon-Feliciano
(74) *Attorney, Agent, or Firm* — NSIP Law

(57)          ABSTRACT

Steering devices and methods for a vehicle are provided, where the method includes monitoring failure of an electric steering system, calculating a target yaw rate value and a target velocity value of the vehicle based on a signals received from one or more sensors, in response to detecting the failure in the electric steering system, detecting a wheel angle of a front wheel portion, performing backup steering based on generating slip in the vehicle to move the vehicle in a direction corresponding to an intended direction, and controlling a velocity of the vehicle to drive the vehicle based on an intended velocity, wherein the performing of the backup steering includes calculating a braking torque for each of the front wheel portion and a rear wheel portion based on the velocity and an steering angle, and distributing the braking torque to the front wheel portion and the rear wheel portion.

12 Claims, 7 Drawing Sheets

(51) Int. Cl.

| | |
|---|---|
| *B60W 10/184* | (2012.01) |
| *B60W 40/105* | (2012.01) |
| *B60W 40/114* | (2012.01) |
| *B60W 50/00* | (2006.01) |
| *B62D 5/04* | (2006.01) |

(52) U.S. Cl.
CPC ........ *B60W 40/105* (2013.01); *B60W 40/114* (2013.01); *B62D 5/0481* (2013.01); *B60W 2050/0011* (2013.01); *B60W 2510/18* (2013.01); *B60W 2510/202* (2013.01); *B60W 2540/10* (2013.01); *B60W 2540/12* (2013.01); *B60W 2540/18* (2013.01); *B60W 2710/0666* (2013.01); *B60W 2710/18* (2013.01); *B60W 2720/10* (2013.01); *B60W 2720/14* (2013.01); *B60W 2720/20* (2013.01)

(58) Field of Classification Search
CPC ..... B60W 2050/0011; B60W 2510/18; B60W 2510/202; B60W 2540/10; B60W 2540/12; B60W 2540/18; B60W 2710/0666; B60W 2710/18; B60W 2720/10; B60W 2720/14; B60W 2720/20; B60W 10/18; B60W 10/20; B60W 2510/20; B60W 2520/10; B60W 2520/14; B60W 2540/103; B60W 2710/207; B60W 50/02; B60W 50/0205; B62D 5/0481; B62D 9/005; B62D 5/0484; B62D 6/002; B62D 9/002; B60T 8/1755; B60Y 2306/13

See application file for complete search history.

(56) References Cited

U.S. PATENT DOCUMENTS

| | | | | |
|---|---|---|---|---|
| 2019/0270444 A1* | 9/2019 | Park | ...................... | B60W 10/18 |
| 2019/0315346 A1* | 10/2019 | Yoo | ...................... | G05D 1/0061 |
| 2021/0206393 A1* | 7/2021 | Yang | ........................ | B60N 2/04 |
| 2022/0073054 A1* | 3/2022 | Sallee | ................. | B60W 40/105 |
| 2024/0217505 A1* | 7/2024 | Wang | ................. | B60W 10/184 |

FOREIGN PATENT DOCUMENTS

| | | | | | |
|---|---|---|---|---|---|
| KR | 20190086239 A | * | 7/2019 | .......... | B60W 10/184 |
| KR | 20210010729 A | * | 1/2021 | ...... | B60W 30/18127 |
| WO | WO 2019218696 A1 | * | 11/2019 | .......... | B60T 8/17558 |

OTHER PUBLICATIONS

Machine Translation of KR20190086239A PDF File Name: "KR20190086239A_Machine_Translation.pdf" (Year: 2019).*
Machine Translation of WO2019218696A1 PDF File Name: "WO2019218696A1_Machine_Translation.pdf" (Year: 2019).*
Machine Translation of JP 2008114642 A PDF File Name: "JP2008114642A_Machine_Translation.pdf" (Year: 2008).*
Machine Translation of EP 3284629 A1 PDF File Name: "EP3284629A1_Machine_Translation.pdf" (Year: 2018).*

* cited by examiner

|  |  | Steering Wheel Angle [deg] | | | | | |
|---|---|---|---|---|---|---|---|
|  |  | 10 | 20 | 30 | 40 | 50 | 60 |
| Velocity[kph] | 10 | 1.000 | 1.000 | 1.000 | 1.000 | 0.954 | 0.879 |
|  | 20 | 1.000 | 1.000 | 1.000 | 1.000 | 0.939 | 0.864 |
|  | 30 | 1.000 | 1.000 | 1.000 | 1.000 | 0.916 | 0.840 |
|  | 40 | 1.000 | 1.000 | 1.000 | 0.981 | 0.889 | 0.813 |
|  | 50 | 1.000 | 1.000 | 1.000 | 0.953 | 0.861 | 0.785 |
|  | 60 | 1.000 | 1.000 | 1.000 | 0.926 | 0.833 | 0.757 |
|  | 70 | 1.000 | 1.000 | 1.000 | 0.900 | 0.808 | 0.732 |
|  | 80 | 1.000 | 1.000 | 0.995 | 0.878 | 0.785 | 0.710 |

STEERING APPARATUS FOR VEHICLE AND METHOD THEREFOR

CROSS-REFERENCE TO RELATED APPLICATION

The present application claims the benefit under 35 USC § 119(a) of Korean Patent Application No. 10-2022-0151846, filed on Nov. 14, 2022 in the Korean Intellectual Property Office, the entire disclosure of which is incorporated herein by reference for all purposes.

BACKGROUND

1. Field

The following description relates to a steering device of a vehicle and a method of controlling the same.

2. Description of Related Art

The contents described in the present disclosure simply provide background information for the present disclosure and do not constitute prior art.

A Steer by Wire (SBVV) system is a system which eliminates mechanical linkages such as a steering column or universal joint and a pinion shaft between a steering wheel and a wheel and transmits an electrical signal to a motor connected to a rack to control steering of a vehicle.

The SBW system applies a redundant design in case a failure occurs in any one unit or system. The SBW system may dualize a steering system by applying the redundant design. However, since the redundant design of the SBW system is configured by dualizing one unit or system, there is a problem in that manufacturing cost increases. In addition, when all dualized structures for redundancy fail, there is a problem in that the steering system cannot be controlled.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of controlling a steering device of a vehicle, the method including monitoring failure of an electric steering system, calculating a target yaw rate value and a target velocity value of the vehicle based on a signals received from one or more of an acceleration pedal stroke sensor, a brake pedal stroke sensor, a steering angle sensor, and a steering torque sensor, in response to detecting that the failure has occurred in the electric steering system, detecting a wheel angle of a front wheel portion of the vehicle, performing backup steering based on generating slip in the vehicle so that the vehicle moves in a direction corresponding to an intended direction, and controlling a velocity of the vehicle so that the vehicle is driven based on an intended velocity, wherein the performing of the backup steering includes calculating a braking torque for each of the front wheel portion and a rear wheel portion based on the velocity of the vehicle and an steering angle of the vehicle, and distributing the braking torque to the front wheel portion and the rear wheel portion.

The distributing of the braking torque may include distributing and applying the braking torque to the front wheel portion and the rear wheel portion to compensate for a total yaw moment value of the vehicle proportional to the steering angle, applying the braking torque to the rear wheel portion to compensate for the total yaw moment value, in response to the steering angle being 20° or less, and first applying the braking torque to the rear wheel portion and after applying the braking torque to the rear wheel portion, applying the braking torque to the front wheel portion to compensate for the total yaw moment value, in response to the steering angle being 50° or greater.

The distributing of the braking torque may include distributing the braking torque to the front wheel portion and the rear wheel portion based on a distribution ratio to compensate for the total yaw moment value, in response to the steering angle being 20° to 50° and the velocity of the vehicle being 40 km/h to 80 km/h.

The performing of the backup steering may include calculating an actual yaw moment value for generating the slip in the vehicle by comparing a wheel arrangement state of the front wheel portion to the intended direction.

The actual yaw moment value may be calculated by multiplying a yaw moment value of the vehicle and a compensation constant, wherein the actual yaw moment value may decrease proportionally with the wheel angle of the front wheel portion in response to the wheel arrangement state of the front wheel portion and the intended direction being the same, and may increase proportionally with the wheel angle of the front wheel portion in response to the wheel arrangement state of the front wheel portion and the direction intended by the driver being different.

The controlling of the velocity of the vehicle may include increasing an engine torque of the vehicle in response to determining that the velocity of the vehicle is different from the intended velocity, and compensating for the velocity of the vehicle by applying the braking torque to the front wheel portion and the rear wheel portion in response to the velocity of the vehicle exceeds the intended velocity.

The controlling of the velocity of the vehicle may include compensating for the velocity of the vehicle based on Proportional-Integral-Differential (PID) control response to an acceleration pedal effort being detected and performing control so that the velocity of the vehicle does not exceed the intended velocity.

In another general aspect, there is provided a steering apparatus of a vehicle, the apparatus including a sensor module configured to detect one or more of an acceleration pedal stroke, a brake pedal stroke, a steering angle, a steering torque, an engine torque, and a braking torque of each wheel, a controller configured to apply the braking torque to a front wheel portion and a rear wheel portion based on the acceleration pedal stroke, the brake pedal stroke, the steering angle, the steering torque, the engine torque, and the braking torque of each wheel detected from the sensor module in response to determining that failure has occurred in an electric steering system and to perform backup steering of the vehicle, and a driver configured to generate slip in the vehicle using the front wheel portion and the rear wheel portion based on a driving signal of the controller and to drive the vehicle so that vehicle rotates in an intended direction.

The sensor may include one or more of an acceleration pedal stroke sensor, a brake pedal stroke sensor, a steering angle sensor, a steering torque sensor, an engine torque sensor, and a braking torque sensor.

The controller may include a monitor configured to detect failure of the electric steering system, a calculator configured to calculate a target yaw rate value and a target velocity value of the vehicle based on information received from the sensor module, a backup steerer configured to generate slip in the vehicle so that the vehicle moves in a direction corresponding to an intended direction to perform backup steering, and a vehicle speed controller configured to control a velocity of the vehicle so that the velocity of the vehicle corresponds to an intended velocity.

The backup steerer may be configured to distribute and apply the braking torque to the front wheel portion and the rear wheel portion to compensate for a total yaw moment value of the vehicle proportional to the steering angle.

The backup steerer may be configured to compensate for a total yaw moment value of the vehicle by comparing a wheel arrangement state of the front wheel portion to the intended direction to generate the slip in the vehicle.

The vehicle speed controller may be configured to control the vehicle so that the velocity of the vehicle is equal to or less than the intended velocity by increasing the engine torque or applying the braking torque to the front wheel portion and the rear wheel portion.

Other features and aspects will be apparent from the following detailed description, the drawings, and the claims.

Figure 1:
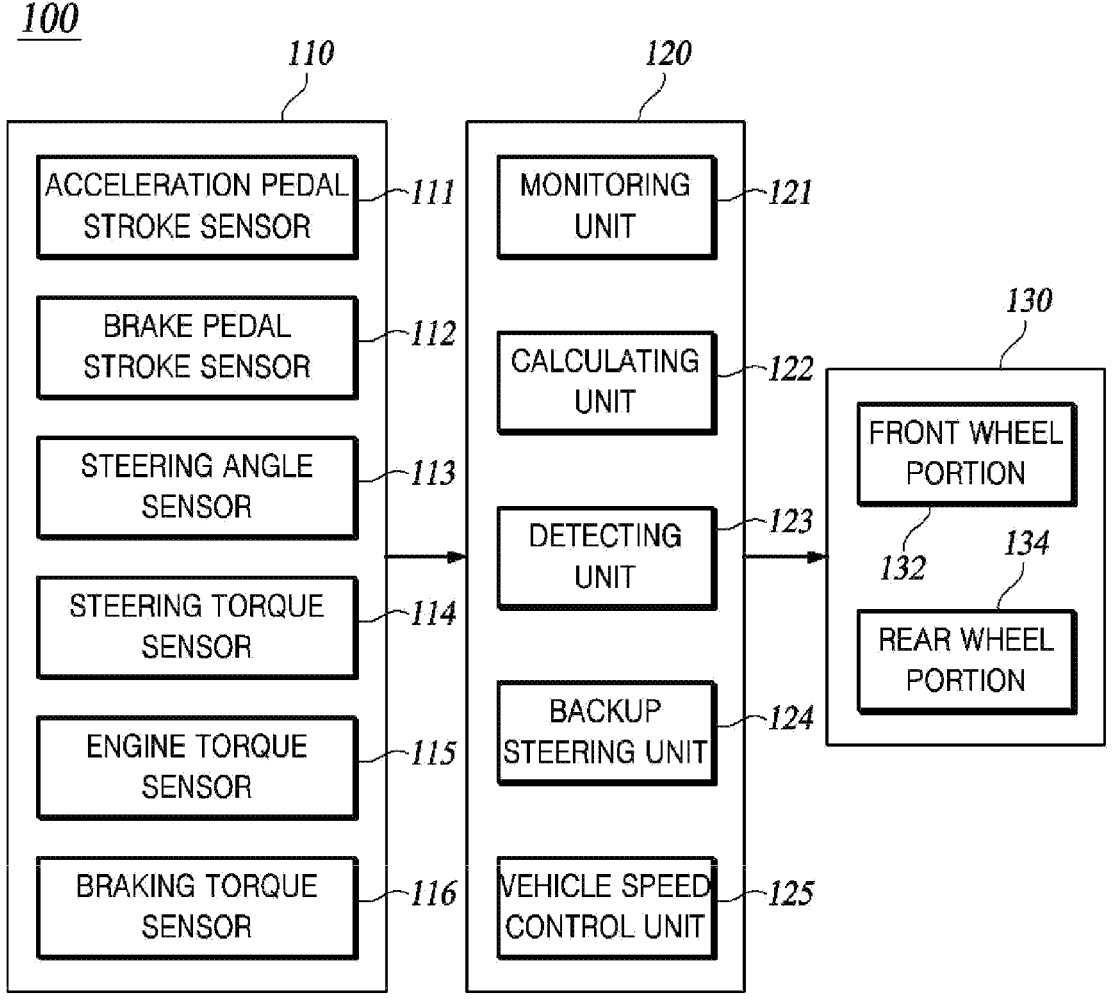
FIG. 1 is a block diagram illustrating a configuration of a steering device of a vehicle according to one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

An electric steering system may apply a redundant design to increase driving stability of a vehicle. That is, the electric steering system may be designed to enable backup steering when a failure occurs in the electric steering system. However, despite the redundant design, all dualized systems may fail and threaten the safety of the driver. A steering device 100 of a vehicle of the present disclosure has the effect of securing a triple safety structure by cooperating with other control units.

FIG. 1 is a block diagram illustrating a configuration of a steering device of a vehicle according to one embodiment of the present disclosure.

Referring to FIG. 1, the steering device 100 of the vehicle may include all or some of a sensor module 110 (which may also be referred to as sensor unit 110), a controller 120 (which may also be referred to as a control unit 120), and a driver 130 (which may also be referred to as a driving unit 130).

The sensor unit 110 may include an acceleration pedal stroke sensor 111, a brake pedal stroke sensor 112, a steering angle sensor 113, a steering torque sensor 114, an engine torque sensor 115, and a braking torque sensor 116. The steering device 100 of the vehicle may perform torque vectoring using factors received from the sensor unit 110. Here, the torque vectoring is a function of distributing torque transmitted to each wheel of the vehicle. The steering device 100 of the vehicle can improve vehicle handling and power performance by using the torque vectoring.

The acceleration pedal stroke sensor 111 may be connected to an acceleration pedal (not illustrated) of the vehicle to detect a pedal effort applied to the acceleration pedal by the driver.

The brake pedal stroke sensor 112 may be connected to a brake pedal (not illustrated) to detect a pedal effort applied to the brake pedal by the driver.

The steering angle sensor 113 may detect a steering angle requested by a driver.

The steering torque sensor 114 may detect steering torque applied to a steering shaft of the vehicle.

The engine torque sensor 115 may detect torque generated in an engine of the vehicle.

The braking torque sensor 116 may be disposed at each of a right front wheel FR, a left front wheel FL, a right rear wheel RR, and a left rear wheel RL of the vehicle. The braking torque sensor 116 may detect braking torque of each wheel.

When steering of the vehicle is impossible, the sensor unit 110 may detect the velocity and steering angle of the vehicle and provide them to the control unit 120 so that the steering device 100 of the vehicle may perform backup steering.

The control unit 120 may include a monitor 121 (which may also be referred to as a monitoring unit 121), a calculator 122 (which may also be referred to as calculating unit 122), a detector 123 (which may also be referred to as a detecting unit 123), a backup steerer 124 (which may also be referred to as a backup steering unit 124), and a vehicle speed controller 124 (which may also be referred to as a vehicle speed control unit 125).

The monitoring unit 121 may monitor the steering state of the vehicle. For example, the monitoring unit 121 may monitor whether the function of the steering system of the vehicle is lost based on the detection signal received from the sensor unit 110.

The calculating unit 122 may calculate a target yaw rate value and a target velocity value of the vehicle based on information received from the sensor unit 110.

The detecting unit 123 may detect a wheel angle of the front wheel portion 132. The detecting unit 123 may receive information on a wheel angle of the front wheel portion 132 from the steering angle sensor 113 and detect whether the received wheel angle of the front wheel portion 132 is within a preset range. For example, when it determines that the wheel angle of the front wheel portion 132 exceeds the preset range, the detecting unit 123 may transmit a detection signal to the backup steering unit 124.

The backup steering unit 124 may perform the backup steering by generating slip in the vehicle so that the vehicle moves in a direction corresponding to the direction intended by the driver. The backup steering unit 124 may calculate and distribute the required braking torque to each of the front wheel portion and the rear wheel portion based on the velocity and steering angle of the vehicle.

The vehicle speed control unit 125 may increase the engine torque of the vehicle or increase the braking force of the front wheel portion 132 and the rear wheel portion 134 to control the vehicle so that the velocity of the vehicle is equal to or less than the velocity intended by the driver.

The vehicle speed control unit 125 may control the vehicle velocity based on Proportional-Integral-Differential control (PID control). Here, the PID control has a form of feedback control. In the PID control, an output of a subject to be controlled is measured, and an error is calculated by comparing the measured output to a reference value or set point. The PID control may calculate an output required for a process using the calculated error value.

The vehicle speed control unit 125 may control the vehicle velocity based on the velocity intended by the driver. For example, the vehicle speed control unit 125 may detect the velocity intended by the driver and perform control so that the velocity of the vehicle is less than the velocity intended by the driver. When the backup steering unit 124 applies braking torque to the front wheel portion 132 and the rear wheel portion 134 to generate slip in the vehicle, the vehicle speed control unit 125 compares the velocity intended by the driver to the velocity of the vehicle. Here, when a difference occurs between the velocity intended by the driver and the vehicle velocity, the vehicle speed control unit 125 applies engine torque to the vehicle based on PID control. After the vehicle speed control unit 125 applies engine torque to the vehicle based on PID control, in a case in which the vehicle velocity exceeds the velocity intended by the driver, the braking torque is applied to the front wheel portion 132 and the rear wheel portion 134 to compensate for the vehicle velocity.

The driving unit 130 may include a front wheel portion (FR and FL, 132) and a rear wheel portion (RR and RL, 134). The front wheel portion (FR and FL, 132) may include a right front wheel (FR) and a left front wheel (FL). The right front wheel FR and the left front wheel FL may be disposed facing each other at both ends of the same shaft. The rear wheel portion (RR and RL, 134) may include a right rear wheel (RR) and a left rear wheel (RL). The right rear wheel RR and the left rear wheel RL may be disposed facing each other at both ends of the same shaft.

The driving unit 130 may receive a driving signal from the control unit 120 and generate braking force using the front wheel portion 132 and the rear wheel portion 134. The driving unit 130 may generate slip in a vehicle that has lost steering control function, so that the vehicle may be driven to rotate in a direction intended by the driver.

Figure 2:
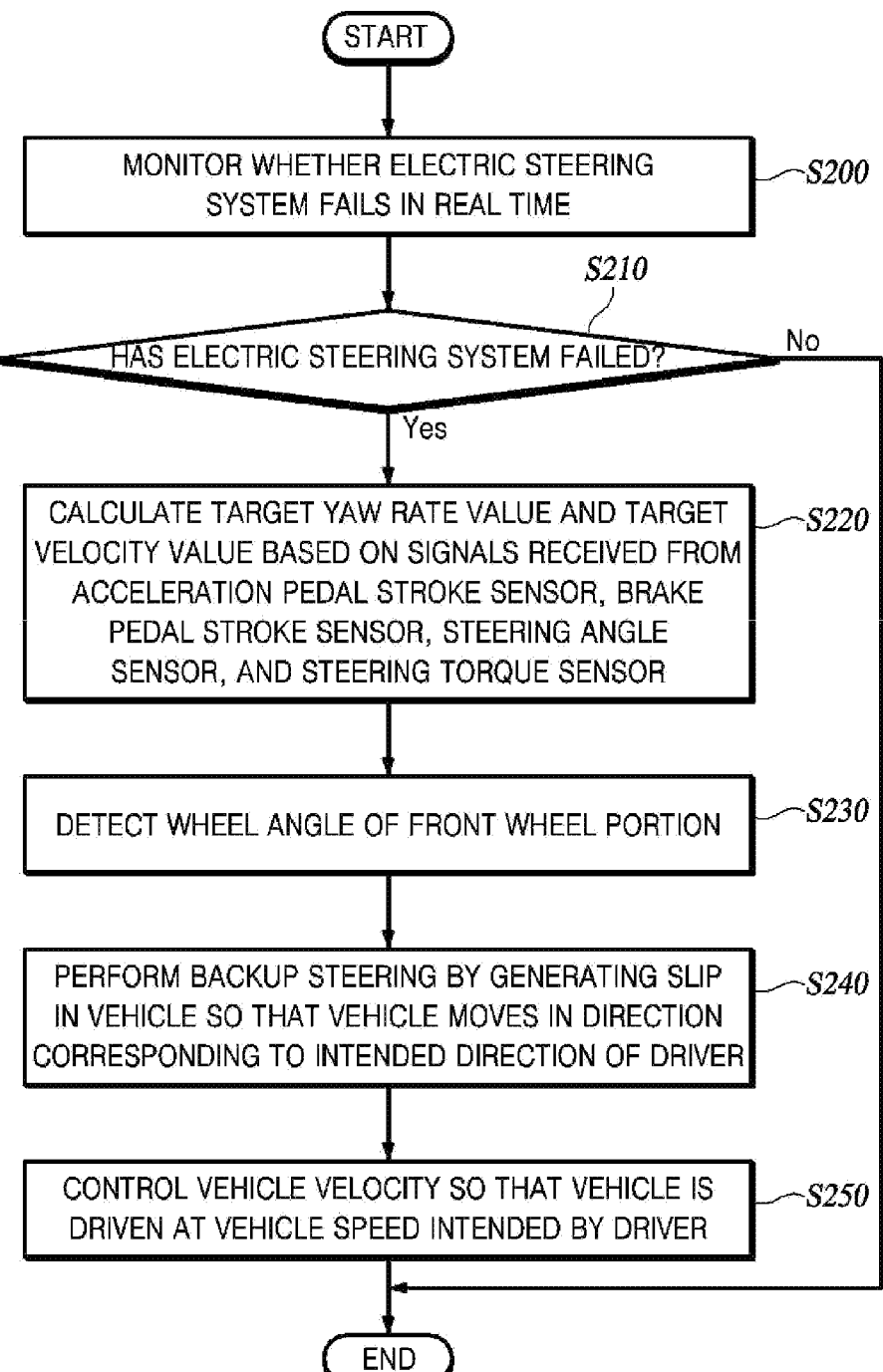
FIG. 2 is a flowchart illustrating a method for controlling the steering device of the vehicle according to one embodiment of the present disclosure.

FIG. 2 is a flowchart illustrating a method for controlling the steering device of the vehicle according to one embodiment of the present disclosure.

Referring to FIG. 2, whether the electric steering system fails is monitored in real time (S200). The monitoring unit 121 may monitor whether the electric steering system fails and whether the vehicle has lost steering function.

Whether the electric steering system fails is determined (S210). The control unit 120 may determine whether the electric steering system fails based on the failure signal received from the sensor unit 110.

In Step S210, when it is determined that the electric steering system fails, the target yaw rate value and target velocity value of the vehicle are calculated based on the signals received from the acceleration pedal stroke sensor 111, brake pedal stroke sensor 112, steering angle sensor 113, and steering torque sensor 114 (S220). The calculating unit 122 may calculate the target yaw rate value and the target velocity value of the vehicle based on information received from the sensor unit 110.

The wheel angle of the front wheel portion 132 is detected (S230). The detecting unit 123 may detect the wheel angle of the front wheel portion 132 based on the information received from the sensor unit 110.

Backup steering is performed by generating slip in the vehicle so that the vehicle moves in a direction corresponding to the direction intended by the driver (S240). The backup steering unit 124 may perform control so that the vehicle turns in a direction corresponding to the steering angle required by the driver.

The vehicle velocity is controlled so that the vehicle is driven at the vehicle speed intended by the driver (S250). The vehicle speed control unit 125 may apply engine torque or braking torque to the driving units 132 and 134 so that the vehicle is driven at the vehicle speed intended by the driver.

Figure 3A:
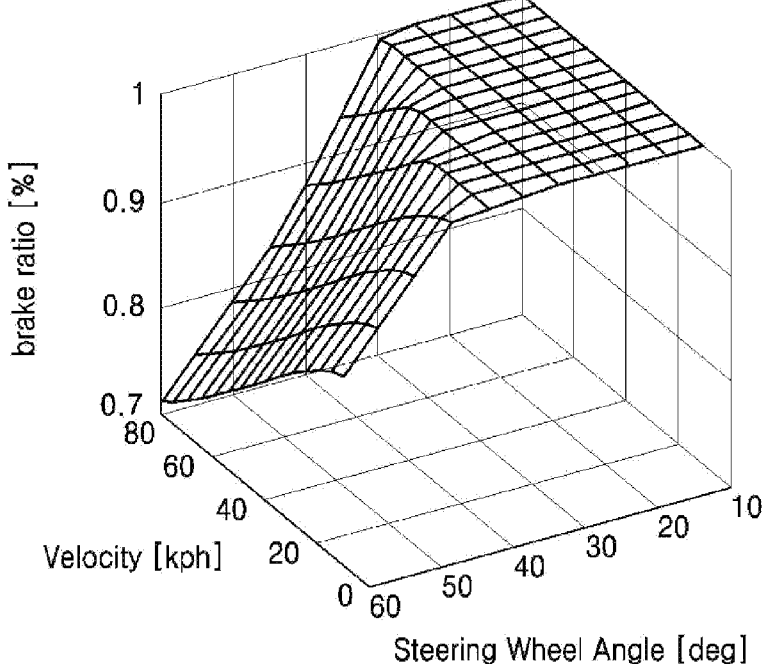
FIG. 3A is a graph illustrating a braking ratio of the vehicle according to velocity and a steering angle of the vehicle.

FIG. 3A is a graph illustrating a braking ratio of the vehicle according to the velocity and the steering angle of the vehicle.

Figure 3B:
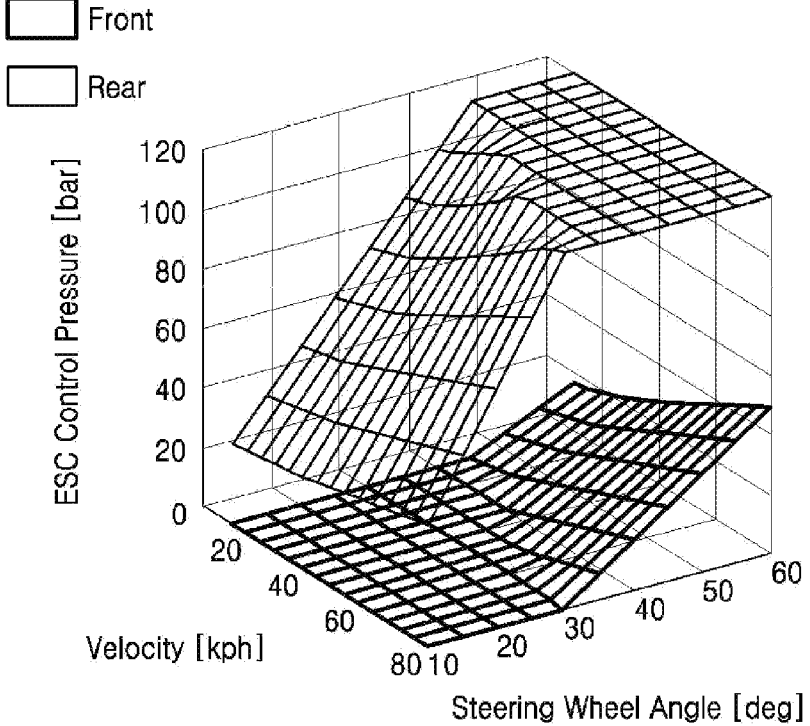
FIG. 3B is a graph illustrating braking torque distribution ratios of a front wheel portion and a rear wheel portion according to the velocity and steering angle of the vehicle.

FIG. 3B is a graph illustrating braking torque distribution ratios of the front wheel portion and the rear wheel portion according to the velocity and steering angle of the vehicle.

Referring to FIG. 3A, the higher the vehicle velocity and the larger the steering angle, the lower the braking ratio of the vehicle. When the velocity of the vehicle is, for example, 80 Km/h and the steering angle of the vehicle is 60°, the braking ratio of the vehicle may be 0.7 based on a maximum braking ratio of 1.0. Here, the maximum braking ratio 1.0 indicates a braking torque ratio distributed to the rear wheel portion 134. In addition, the maximum braking ratio 1.0 means that 100% of the braking torque is applied to the rear wheel portion 134 to compensate for a total yaw moment value of the vehicle.

Referring to FIG. 3B, the braking torque may be distributed to the front wheel portion 132 and the rear wheel portion 134 based on the vehicle velocity and the steering angle required by the driver. As the steering angle required by the driver increases, the yaw moment value required for the vehicle increases. As the yaw moment value required for the vehicle increases, the total yaw moment value of the vehicle cannot be compensated for with only the braking torque of the rear wheel portion 134. Accordingly, the total yaw moment value of the vehicle may be compensated for by using the braking torque of the rear wheel portion 134 and the braking torque of the front wheel portion 132 to compensate for the total yaw moment value of the vehicle. Here, the braking torque of the rear wheel portion 134 is first applied, and a portion of the yaw moment value which is not compensated for by the braking torque of the rear wheel portion 134 among the total yaw moment value may be compensated for by using the braking torque of the front wheel portion 132.

Figures 4, 5:
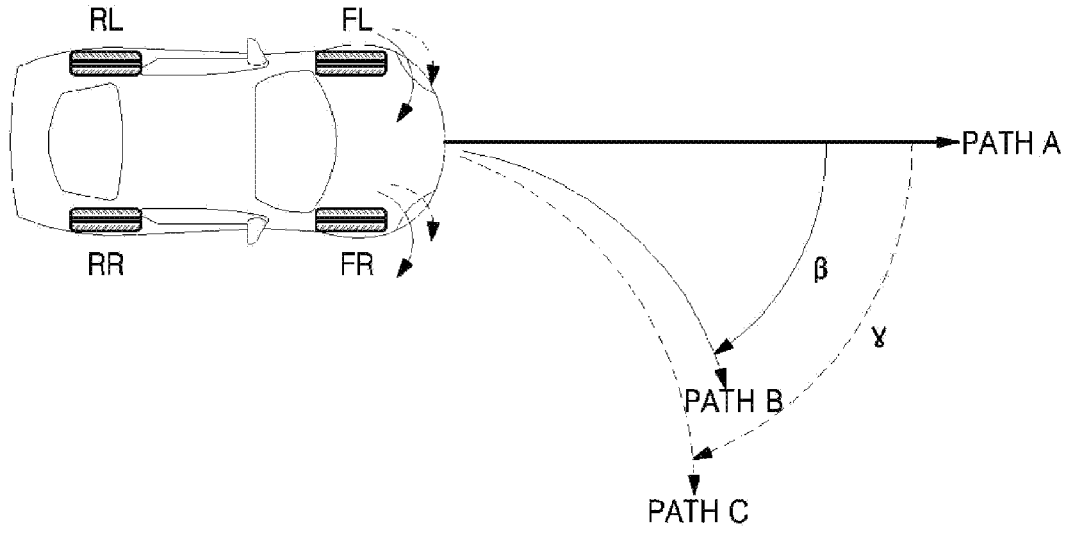
FIG. 4 is a table illustrating braking torque distribution ratios of the front wheel portion and the rear wheel portion according to the velocity and steering angle of the vehicle.
FIG. 5 is a diagram illustrating a path of a vehicle according to a steering angle required by a driver and backup steering.

FIG. 4 is a table illustrating the braking torque distribution ratios of the front wheel portion and the rear wheel portion according to the velocity and steering angle of the vehicle.

Referring to FIG. 3B and FIG. 4, as the steering angle required by the driver increases, the total yaw moment value of the vehicle increases. Therefore, when the steering angle required by the driver and the velocity exceed a predetermined range, the total yaw moment value of the vehicle cannot be compensated for with only the braking torque of the rear wheel portion 134. For example, when the steering angle required by the driver is 20° or less, braking torque is applied to the rear wheel portion 134 to compensate for a total yaw moment value proportional to the yaw moment value required for the vehicle. When the steering angle required by the driver is 50° or greater, the braking torque is distributed first to the rear wheel portion 134, and when the total yaw moment value of the vehicle cannot be compensated for with only the braking torque of the rear wheel portion 134, the total yaw moment value of the vehicle may be compensated for by distributing braking torque to the front wheel portion 132.

As another example, when the velocity of the vehicle is, for example, 10 km/h to 80 km/h, and the required steering angle of the vehicle is, for example, 10° to 20°, the braking torque of 1.0 is distributed. As another example, when the velocity of the vehicle is 10 km/h and the required steering angle of the vehicle is 50°, the braking torque is distributed to the rear wheel portion 134 and the front wheel portion 132 based on the distribution ratio of 0.954. Here, the distribution ratio of 0.954 means that 95.4% of the braking torque is applied to the rear wheel portion 134 and 4.6% to the front wheel portion.

When the steering angle required by the driver is 20° to 50° and the vehicle velocity is 40 km/h to 80 km/h, the braking torque may be distributed based on the distribution ratio preset in the front wheel portion 132 and rear wheel portion 134.

FIG. 5 is a diagram illustrating a path of a vehicle according to the steering angle required by the driver and the backup steering.

Referring to FIG. 5, when the electric steering system fails, the steering device 100 of the vehicle may backup the electric steering system based on the steering angle required by the driver, the current steering angle of the vehicle, and the wheel angle of the front wheel portion 132.

When the electric steering system fails, the vehicle will move along a path A regardless of the steering intention of the driver. Here, the steering device 100 of the vehicle may detect the steering angle required by the driver and detect a steering angle γ corresponding to the required steering angle. Here, the traveling path of the vehicle corresponding to the steering angle γ is a path C. The steering device 100 of the vehicle may apply the braking torque to the front wheel portion 132 and the rear wheel portion 134 and generate slip in the vehicle to rotate the vehicle by a steering angle β corresponding to the steering angle γ. Here, the path corresponding to the steering angle β is a path B.

The steering device 100 of the vehicle may apply a bicycle dynamics model to the vehicle based on sensor values received from the acceleration pedal stroke sensor 111, the steering angle sensor 113, the steering torque sensor 114, and the braking torque sensor 116. Here, the bicycle dynamics model is a lateral model of a two-degree-of-freedom vehicle.

The lateral model of the two-degree-of-freedom vehicle may be defined based on a control input value, a sliding variable, and a sliding condition. Here, the control input value means a moment value in a yaw direction of the vehicle. The sliding condition may be set based on the Lyapunov function, and the time derivative may be set to have a negative number.

Figure 6A:
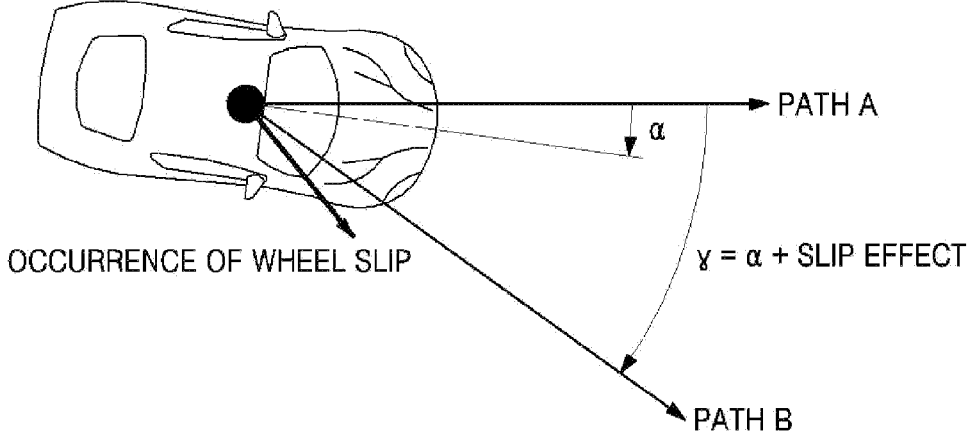
FIG. 6A is a diagram illustrating an example in which wheel slip occurs in a vehicle when a direction intended by the driver and a wheel arrangement state of a front wheel portion are in the same direction.

FIG. 6A is a diagram illustrating an example in which wheel slip occurs in the vehicle when the direction intended by the driver and the wheel arrangement state of the front wheel portion are in the same direction.

Figure 6B:
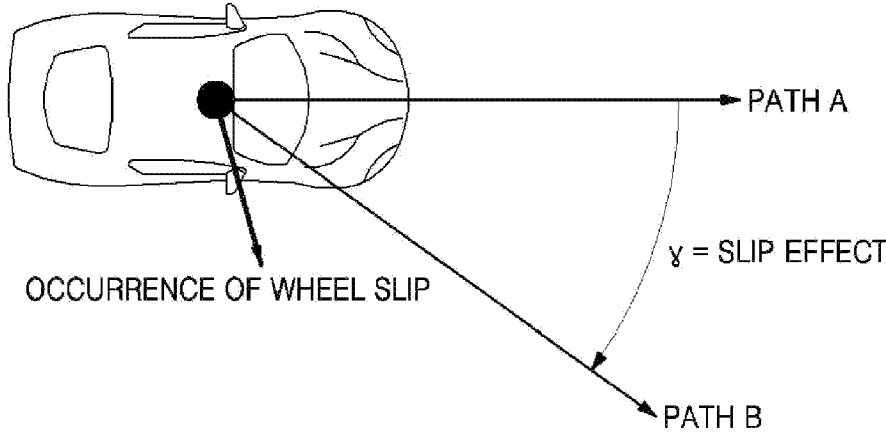
FIG. 6B is a diagram illustrating an example in which wheel slip occurs when the wheel arrangement state of the front wheel portion is aligned.

FIG. 6B is a diagram illustrating an example in which wheel slip occurs when the wheel arrangement state of the front wheel portion is aligned.

Referring to FIG. 5, FIG. 6A, and FIG. 6B, when the vehicle tries to rotate along the path B using the slip of the vehicle, the wheel angle of the front wheel portion 132 may be rotated by an angle α. The rotation angle γ of the vehicle corresponding to the path B may be calculated based on the slip of the vehicle and the wheel arrangement state of the front wheel portion 132. For example, when the wheel arrangement state of the front wheel portion 132 is in the same direction as the direction in which the vehicle is to rotate, the rotation angle γ of the vehicle corresponding to the path B may be calculated by adding the wheel angle α of the front wheel portion 132 and the yaw moment angle generated due to slip of the vehicle.

When the wheel angle of the front wheel portion 132 is aligned with the direction of the vehicle, in a case where the vehicle slips, the vehicle may rotate by a rotation angle γ corresponding to the slip. Here, the wheel angle of the front wheel portion 132 being aligned with the direction of the vehicle means that the rotation angle of the front wheel portion 132 is 0°.

The backup steering unit 124 may increase the braking torque of the rear wheel portion 134. The backup steering unit 124 generates a braking force on the right rear wheel RR, which is the rear wheel in the rotational direction of the vehicle, and when the vehicle rotates, the right rear wheel RR may serve as a hinge.

After the backup steering unit 124 performs control to increase the pressure of the rear wheel portion, the backup steering unit 124 may control the orientation of the vehicle by controlling an ARS device (not illustrated) such as a suspension. Here, the ARS device may generate a yaw moment intended by the driver by controlling the vehicle so that a vehicle body at the opposite side of the rotational direction of the vehicle is elevated.

When the vehicle is stopped and the driver generates a steering signal in a direction to the right hand (RH) side, the backup steering unit 124 applies reverse torque to the right front wheel FR and forward torque to the left front wheel FL, and thus, the yaw moment intended by the driver may be generated. Here, the forward direction means a direction in which the vehicle travels, and the reverse direction means a direction opposite to the direction in which the vehicle travels.

Meanwhile, when the vehicle is at low speed, the backup steering unit 124 may generate the yaw moment intended by the driver by stopping the right front wheel FR and applying forward torque to the left front wheel FL.

Figure 7:
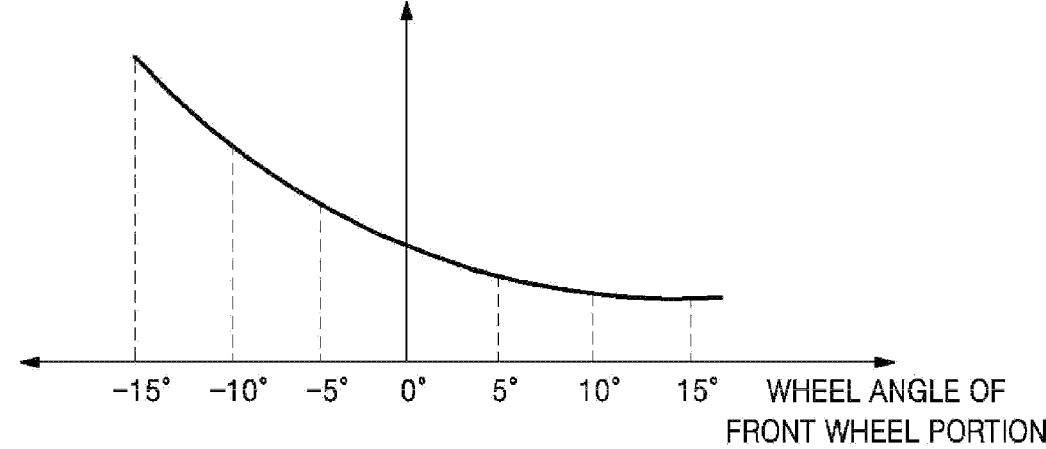
FIG. 7 is a graph illustrating an actual yaw moment of the vehicle according to a wheel angle of a front wheel portion.

FIG. 7 is a graph illustrating an actual yaw moment of the vehicle according to the wheel angle of the front wheel portion.

Referring to FIG. 7, a backup control amount of the vehicle is determined based on the wheel arrangement state of the front wheel portion 132 and the steering angle required by the driver. Here, the backup control amount may be the actual yaw moment value of the vehicle generated due to slip of the vehicle. The actual yaw moment value required for the vehicle may be determined based on a case where the wheel angle of the front wheel portion 132 is 0°, that is, when the wheel arrangement state of the front wheel portion 132 is aligned with the vehicle.

When the wheel angle of the front wheel portion 132 is a negative number, the actual yaw moment value may increase nonlinearly as the wheel angle of the front wheel portion 132 increases. Conversely, when the wheel angle of the front wheel portion 132 is a positive number, the actual yaw moment value may nonlinearly increase the wheel angle of the front wheel portion 132. Here, the negative number indicates the wheel arrangement state in a direction opposite to the rotational direction of the vehicle, and the positive number indicates the wheel arrangement state in the same direction as the rotational direction of the vehicle.

When the direction corresponding to the steering angle required by the driver is to the right hand (RH) side and the wheel angle of the front wheel portion 132 is a negative number, the braking yaw moment for generating the slip in the vehicle increases. Using this, the actual yaw moment value of the vehicle may be a value calculated by multiplying the required yaw moment value of the vehicle by a compensation constant K.

The backup control amount of the vehicle, that is, the actual yaw moment value required for the vehicle is determined based on the wheel arrangement state of the front wheel portion 132 and the steering angle required by the driver. When the wheel arrangement state of the front wheel portion 132 is in the same direction as the direction corresponding to the steering angle required by the driver, the actual yaw moment value required for the vehicle is relatively reduced. On the other hand, when the wheel arrangement state of the front wheel portion 132 is opposite to the direction corresponding to the steering angle required by the driver, the actual yaw moment value required for the vehicle increases relatively. That is, the actual yaw moment value may be increased or decreased based on the arrangement state of the front wheel portion 132.

According to one embodiment, the steering device 100 of the vehicle can reduce the manufacturing costs by implementing the backup function using the existing system.

According to one embodiment, the steering device 100 of the vehicle can back up the steering system of the vehicle using the braking system.

According to one embodiment, the steering device 100 of the vehicle can implement a triple redundant system.

According to one or more embodiments described above, there is provided a steering device of a vehicle and a method of controlling the same capable of reducing manufacturing costs by implementing a backup function using an existing system.

According to one or more embodiments described above, there is provided a steering device of a vehicle and a method of controlling the same capable of backing up a steering system of a vehicle using a braking system.

According to one or more embodiments described above, there is provided a steering device of a vehicle and a method of controlling the same capable of implementing a triple redundant system.

According to one or more embodiments described above, the steering device of a vehicle and the method of controlling the same can implement a backup function using an existing system, thereby reducing manufacturing costs.

According to one or more embodiments described above, the steering device of a vehicle and the method of controlling the same can back up a steering system of the vehicle using a braking system.

According to one or more embodiments described above, the steering device of a vehicle and the method of controlling the same can implement a triple redundant system.

The sensor module 110 or sensor unit 110, controller 120 or control unit 120, driver 130 or driving unit 130, a monitor 121 or monitoring unit 121, calculator 122 or calculating unit 122, detector 123 or detecting unit 123, backup steerer 124 or backup steering unit 124, vehicle speed controller 124 or vehicle speed control unit 125 and the computing apparatuses, the electronic devices, the processors, the memories, and other components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of controlling a steering device of a vehicle, the method comprising:
monitoring failure of an electric steering system;
calculating a target yaw rate value and a target velocity value of the vehicle based on signals received from one or more of an acceleration pedal stroke sensor, a brake pedal stroke sensor, a steering angle sensor, and a steering torque sensor, in response to detecting the failure in the electric steering system;
detecting a wheel angle of a front wheel portion of the vehicle;
performing backup steering based on generating slip in the vehicle to move the vehicle in a direction corresponding to an intended direction; and
controlling a velocity of the vehicle so that the vehicle is driven based on an intended velocity,
wherein the performing of the backup steering comprises calculating a braking torque for each of the front wheel portion and a rear wheel portion based on the velocity of the vehicle and a steering angle of the vehicle, and distributing the braking torque to the front wheel portion and the rear wheel portion,
wherein the distributing of the braking torque comprises:
distributing and applying the braking torque to the front wheel portion and the rear wheel portion with a distribution ratio that varies according to a required steering angle to compensate for a total yaw moment value of the vehicle proportional to the steering angle,
applying the braking torque to the rear wheel portion to compensate for the total yaw moment value, in response to the steering angle being 20° or less, and
first applying the braking torque to the rear wheel portion and after applying the braking torque to the rear wheel portion, applying the braking torque to the front wheel portion to compensate for the total yaw moment value, in response to the steering angle being 50° or greater.

2. The method of claim 1, wherein the distributing of the braking torque comprises distributing the braking torque to the front wheel portion and the rear wheel portion based on a distribution ratio to compensate for the total yaw moment value, in response to the steering angle being 20° to 50° and the velocity of the vehicle being 40 km/h to 80 km/h.

3. The method of claim 1, wherein the performing of the backup steering comprises calculating an actual yaw moment value for generating the slip in the vehicle by comparing a wheel arrangement state of the front wheel portion to the intended direction.

4. The method of claim 3, wherein the actual yaw moment value is calculated by multiplying a yaw moment value of the vehicle and a compensation constant,
wherein the actual yaw moment value decreases proportionally with the wheel angle of the front wheel portion in response to the wheel arrangement state of the front wheel portion and the intended direction being the same, and increases proportionally with the wheel angle of the front wheel portion in response to the wheel arrangement state of the front wheel portion and the direction intended by the driver being different.

5. The method of claim 1, wherein the controlling of the velocity of the vehicle comprises:
increasing an engine torque of the vehicle in response to determining that the velocity of the vehicle is different from the intended velocity, and
compensating for the velocity of the vehicle by applying the braking torque to the front wheel portion and the rear wheel portion in response to the velocity of the vehicle exceeding the intended velocity.

6. The method of claim 5, wherein the controlling of the vehicle further comprises compensating for the velocity of the vehicle based on Proportional-Integral-Differential (PID) control response to an acceleration pedal effort being detected and performing control so that the velocity of the vehicle does not exceed the intended velocity.

7. A steering apparatus of a vehicle, the apparatus comprising:
a sensor module configured to detect one or more of an acceleration pedal stroke, a brake pedal stroke, a steering angle, a steering torque, an engine torque, and a braking torque of each wheel;
a controller configured to apply braking torque to a front wheel portion and a rear wheel portion based on the acceleration pedal stroke, the brake pedal stroke, the steering angle, the steering torque, the engine torque, and the braking torque of each wheel detected from the sensor module in response to determining that failure has occurred in an electric steering system and to perform backup steering of the vehicle; and
a driver configured to generate slip in the vehicle using the front wheel portion and the rear wheel portion based on a driving signal of the controller and to drive the vehicle so that vehicle rotates in an intended direction,
wherein the controller is further configured to:
distribute and apply the braking torque to the front wheel portion and the rear wheel portion with a distribution ratio that varies according to a required steering angle to compensate for a total yaw moment value of the vehicle proportional to the steering angle,
apply the braking torque to the rear wheel portion to compensate for the total yaw moment value, in response to the steering angle being 20° or less, and
first apply the braking torque to the rear wheel portion and, after applying the braking torque to the rear wheel portion, apply the braking torque to the front wheel portion to compensate for the total yaw moment value, in response to the steering angle being 50° or greater.

8. The steering apparatus of claim 7, wherein the sensor comprises one or more of an acceleration pedal stroke sensor, a brake pedal stroke sensor, a steering angle sensor, a steering torque sensor, an engine torque sensor, and a braking torque sensor.

9. The steering apparatus of claim 7, wherein the controller comprises:

a monitor configured to detect failure of the electric steering system, a calculator configured to calculate a target yaw rate value and a target velocity value of the vehicle based on information received from the sensor module, a backup steerer configured to generate slip in the vehicle so that the vehicle moves in a direction corresponding to an intended direction to perform backup steering, and a vehicle speed controller configured to control a velocity of the vehicle so that the velocity of the vehicle corresponds to an intended velocity.

10. The steering apparatus of claim 9, wherein the backup steerer is further configured to distribute and apply the braking torque to the front wheel portion and the rear wheel portion to compensate for a total yaw moment value of the vehicle proportional to the steering angle.

11. The steering apparatus of claim 9, wherein the backup steerer is further configured to compensate for a total yaw moment value of the vehicle by comparing a wheel arrangement state of the front wheel portion to the intended direction to generate the slip in the vehicle.

12. The steering apparatus of claim 9, wherein the vehicle speed controller is further configured to control the vehicle so that the velocity of the vehicle is equal to or less than the intended velocity by increasing the engine torque or applying the braking torque to the front wheel portion and the rear wheel portion.

\* \* \* \* \*